US006369166B1

(12) United States Patent
Wang et al.

(10) Patent No.: US 6,369,166 B1
(45) Date of Patent: Apr. 9, 2002

(54) APPLICATION OF DISUBSTITUTED ETHYLENE-MALEIMIDE COPOLYMERS IN RUBBER COMPOUNDS

(75) Inventors: Xiaorong Wang; Victor J. Foltz, both of Akron, OH (US)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 09/676,073

(22) Filed: Sep. 29, 2000

Related U.S. Application Data

(62) Division of application No. 09/097,034, filed on Jun. 12, 1998, now Pat. No. 6,207,763.

(51) Int. Cl.[7] .............................................. C08F 20/08
(52) U.S. Cl. ................................................... 525/327.4
(58) Field of Search ...................................... 525/327.4

(56) References Cited

U.S. PATENT DOCUMENTS

| | | |
|---|---|---|
| 2,725,367 A | 11/1955 | Niederhauser et al. |
| 2,971,934 A | 2/1961 | Brown et al. |
| 3,244,664 A | 4/1966 | Zelinski et al. |
| 3,281,383 A | 10/1966 | Zelinski et al. |
| 3,297,654 A | 1/1967 | Barr et al. |
| 3,414,551 A | 12/1968 | Reid et al. |
| 3,428,596 A | 2/1969 | Strand et al. |
| 3,480,580 A | 11/1969 | Joyner et al. |
| 3,481,910 A | 12/1969 | Brunson et al. |
| 3,492,227 A | 1/1970 | Kolaian |
| 3,528,936 A | 9/1970 | Kent et al. |
| 3,577,365 A | 5/1971 | Folzenlogen et al. |
| 3,594,452 A | 7/1971 | De La Marre et al. |
| 3,751,378 A | 8/1973 | Cowperthwaite et al. |
| 3,761,458 A | 9/1973 | Holler et al. |
| 3,796,687 A | 3/1974 | Collette et al. |
| 3,840,449 A | 10/1974 | Furukawa et al. |
| 3,862,265 A | 1/1975 | Steinkamp et al. |
| 3,970,608 A | 7/1976 | Furukawa et al. |
| 3,985,830 A | 10/1976 | Fetters et al. |
| 3,998,907 A | 12/1976 | Di Giulio |
| 4,015,612 A | 4/1977 | Pavlik et al. |
| 4,017,669 A | 4/1977 | Collette et al. |
| 4,087,485 A | 5/1978 | Huff |
| 4,104,332 A | 8/1978 | Zelinksi |
| 4,132,531 A | 1/1979 | Cummings et al. |
| 4,139,417 A | 2/1979 | Marie et al. |
| 4,151,336 A | 4/1979 | Sackmann et al. |
| 4,151,337 A | 4/1979 | Kanoh et al. |
| 4,287,314 A | 9/1981 | Fava |
| 4,304,886 A | 12/1981 | Bean et al. |
| 4,374,951 A | 2/1983 | Lee et al. |
| 4,404,321 A | 9/1983 | Abolins et al. |
| 4,404,322 A | 9/1983 | Saito et al. |
| 4,408,010 A | 10/1983 | Le-Khac |
| 4,423,196 A | 12/1983 | Arlt et al. |
| 4,427,828 A | 1/1984 | Hergenrother et al. |

(List continued on next page.)

FOREIGN PATENT DOCUMENTS

| | | |
|---|---|---|
| AU | B-47913/85 | 4/1986 |
| CA | 702610 | 1/1965 |
| DE | 3430802 A1 | 3/1986 |
| DE | 42 25 875 A1 | 2/1994 |
| DE | 42 41 538 A1 | 6/1994 |
| EP | 0 177 401 AI | 4/1986 |
| EP | 0322 905 A2 | 7/1989 |
| EP | 0 408 470 A1 | 1/1991 |
| EP | 0 440 922 A1 | 8/1991 |
| EP | 0 536 753 A1 | 4/1993 |
| EP | 0 728 767 A1 | 8/1996 |
| GB | 922151 | 3/1963 |
| JP | 6-248017 | 9/1954 |
| JP | 6-56921 | 3/1974 |
| JP | 60-243102 | 12/1985 |
| JP | 8183885 A | 7/1996 |
| JP | 8-255901 | 10/1996 |
| JP | 9012834 A | 1/1997 |
| JP | 9012835 A | 1/1997 |
| WO | WO 96/23007 | 8/1996 |
| WO | WO 97/00898 | 1/1997 |

OTHER PUBLICATIONS

L.E. Colleman, Jr., J.F. Bork, and H. Donn, Jr., J. Org. Chem., 24, 185 (1959) Reaction of Primary Alphatle Amines with Maleic Anhydride.

A. Matsumoto, Y. Oki, and T. Otsu, Polymer J., 23(3), 201 (1991). Sythesis, Thermal Properties and Gas permeability of Poly(N–n–alkylmalemide)s.

L. Haeussler, U. Wienhold, V. Albrecht, and S. Zschoche, Thermochim. Acta, 277, 14(1996). Simultaneous TA and MS analysis of Alternating Styrene–Maleic Anhydride and Styrene–Malemide Copolymers.

W. Kim and K. Seo, Macromol. Rapid Commun. 17, 835(1996). Synthesis and Photocrosslinking of Maleimide–Type Polymers.

W. Lee, and G. Hwong, J. Appl. Polym. Sci., 59, 599 (1996). Polysulfobetaines and Corresponding Cationic Polymers. IV. Synthesis and Aqueous Solution Properties of Cationic Poly (MIQSDMAPM).

I. Vermeesch, and G. Groeninckx, J. Appl. Polym. Sci., 53, 1365(1994). Chemical Modification of Poly(styrene–co–maleic anhydride) with Primary N–Alkylamines by Reactive Extrusion.

*Primary Examiner*—Edward J. Cain
(74) *Attorney, Agent, or Firm*—David G. Burleson; Scott A. McCollister

(57) ABSTRACT

The present invention teaches a method for enabling the formation of a high damping compound. The method includes: reacting a poly(disubstituted ethylene-co-maleic acid anhydride) polymer with a primary amine under substantially dry conditions sufficient to form a poly (disubstituted ethylene-co-maleimide) polymer plasticizer, and, dispersing the poly(disubstituted ethylene-co-maleimide) polymer plasticizer within a rubber formulation to form a relatively high damping compound.

20 Claims, No Drawings

U.S. PATENT DOCUMENTS

| | | |
|---|---|---|
| 4,502,229 A | 3/1985 | Kitzman |
| 4,506,056 A | 3/1985 | Gaylord |
| 4,540,753 A | 9/1985 | Cozewith et al. |
| 4,585,824 A | 4/1986 | Uchida et al. |
| 4,605,700 A | 8/1986 | Le-Khac |
| 4,683,275 A | 7/1987 | Kato et al. |
| 4,728,463 A | 3/1988 | Sutker et al. |
| 4,732,928 A | 3/1988 | Mizushiro et al. |
| 4,735,992 A | 4/1988 | Nogues |
| 4,771,097 A | 9/1988 | Sackmann et al. |
| 4,772,657 A | 9/1988 | Akiyama et al. |
| 4,889,896 A | 12/1989 | Canova et al. |
| 4,893,055 A | 1/1990 | Fuzzi et al. |
| 4,912,144 A | 3/1990 | McCready |
| 4,921,910 A | 5/1990 | Lunt et al. |
| 4,931,502 A | 6/1990 | McCready |
| 4,996,262 A | 2/1991 | Pyke et al. |
| 5,008,324 A | 4/1991 | Killgoar, Jr. et al. |
| 5,034,449 A | 7/1991 | Mallikarjun |
| 5,037,924 A | 8/1991 | Tazi et al. |
| 5,082,913 A | 1/1992 | Tazi et al. |
| 5,122,161 A | 6/1992 | Benfaremo et al. |
| 5,126,403 A | 6/1992 | Graiver et al. |
| 5,156,920 A | 10/1992 | Aycock et al. |
| 5,202,384 A | 4/1993 | Pyke et al. |
| 5,212,227 A | 5/1993 | Sakazume et al. |
| 5,219,628 A | 6/1993 | Hathaway et al. |
| 5,225,498 A | 7/1993 | Sorathia et al. |
| 5,244,971 A | 9/1993 | Jean-Marc |
| 5,300,569 A | 4/1994 | Drake et al. |
| 5,318,854 A | 6/1994 | Hamersma et al. |
| 5,356,953 A | 10/1994 | Harada et al. |
| 5,373,048 A | 12/1994 | Witzeman et al. |
| 5,414,044 A | 5/1995 | Moriya et al. |
| 5,432,662 A | 7/1995 | Kato et al. |
| 5,472,741 A | 12/1995 | Sackmann et al. |
| 5,489,657 A | 2/1996 | Sue et al. |
| 5,494,964 A | 2/1996 | Meichsner et al. |
| 5,494,981 A | 2/1996 | Gorodisher et al. |
| 5,508,334 A | 4/1996 | Chen |
| 5,532,317 A | 7/1996 | Shinmura et al. |
| 5,536,774 A | 7/1996 | Segatta |
| 5,548,031 A | 8/1996 | Doi |
| 5,585,434 A | 12/1996 | DeNicola, Jr. et al. |
| 5,585,436 A | 12/1996 | Niessner et al. |
| 5,602,200 A | 2/1997 | Wissmann |
| 5,618,881 A | 4/1997 | Hojabr |
| 5,634,122 A | 5/1997 | Loucks et al. |
| 5,637,410 A | 6/1997 | Bonner et al. |
| 5,651,927 A | 7/1997 | Auda et al. |
| 5,652,307 A | 7/1997 | Niessner et al. |
| 5,654,364 A | 8/1997 | Bates et al. |
| 5,655,820 A | 8/1997 | Kervagoret |
| 5,658,985 A | 8/1997 | Eichenauer et al. |
| 5,665,820 A | 9/1997 | Liestner et al. |
| 5,670,006 A | 9/1997 | Wilfong et al. |
| 5,684,122 A | 11/1997 | Inoue et al. |
| 5,691,411 A | 11/1997 | Khouri et al. |
| 5,710,228 A | 1/1998 | Krause et al. |
| 5,776,234 A | 7/1998 | Schilling |
| 5,783,630 A | 7/1998 | Evans et al. |
| 5,798,413 A | 8/1998 | Spelthann et al. |
| 5,798,414 A | 8/1998 | Mishima et al. |
| 5,821,032 A | 10/1998 | DoMinh |
| 5,869,695 A | 2/1999 | Ulmer et al. |
| 5,883,188 A | 3/1999 | Hwang et al. |
| 5,905,116 A | 5/1999 | Wang et al. |
| 5,912,296 A | 6/1999 | Wang et al. |
| 5,962,572 A | 10/1999 | Chen |
| 5,965,666 A | 10/1999 | Koo et al. |

APPLICATION OF DISUBSTITUTED ETHYLENE-MALEIMIDE COPOLYMERS IN RUBBER COMPOUNDS

This application is a division of U.S. Ser. No. 09/097,034 filed Jun. 12, 1998, now U.S. Pat. No. 6,207,763.

FIELD OF THE INVENTION

The present invention relates to the use of alkylmaleimide copolymers as additives in rubber compounds to improve tensile and tear strengths and damping properties.

BACKGROUND OF THE INVENTION

Poly(isobutylene-co-maleic anhydride) polymer is commercially available and is well known in the prior art. Further, imidization between a maleic anhydride and a primary amine group is a commonly known chemical reaction. Patent publications which have recognized these reactions include: German Patent DE 4241538, assigned to Leuna-Werke A.-G; Japanese Patent JP 94248017, assigned to Monsanto Kasel Kk.; and, Italian Patent EP 322905 A2, assigned to Montedipe S.p.A. Various other non-patent publications have also recognized these reactions. Included among them are: L. E. Colleman, Jr., J. F. Bork, and H. Donn, Jr., J. Org. Chem., 24, 185(1959); A Matsumoto, Y. Oki, and T. Otsu, Polymer J., 23 (3), 201(1991); L. Haeussler, U. Wienhold, V. Albricht, and S. Zschoche, Themochim. Acta, 277, 14(1966); W. Kim, and K. Seo, Macromol. Rapid Commun., 17, 835(1996); W. Lee, and G. Hwong, J. Appl. Polym. Sci., 59, 599(1996); and, I. Vermeesch and G. Groeninckx, J. Appl. Polym. Sci., 53, 1356 (1994).

The synthesis of monofunctional N-alkyl and N-aryl maleimides are also well known in the prior art. They have been extensively used to improve the heat stability of homo- and especially copolymers prepared from vinyl monomers. Typically, the bulk resins comprise ABS (poly(acrylonitrile-co-butadiene-co-styrene)) or a polyblend of poly (acrylonitrile-co-butadiene) and poly(styrene-co-acrylonitrile); PVC (poly(vinyl chloride)); SAN (poly (styrene-co-acrylonitrile)); PMMA (poly(methyl methacrylate)); and the like. The maleimides can be copolymerized with other monomers such as acrylonitrile, butadiene, styrene, methyl methacrylate, vinyl chloride, vinyl acetate and many other comonomers. A more preferred practice in the industry is to produce copolymers of maleimides with other monomers such as styrene and optionally acrylonitrile and to blend these with ABS and SAN resins. In any event, the polymer compositions are adjusted so that the copolymers are fully compatible with the bulk resins (e.g., ABS and/or SAN) as shown by the presence of a single glass transition point ($T_g$) as determined by differential scanning calorimetry (DSC).

It has long been recognized that two or more polymers may be blended together to form a wide variety of random or structured morphologies to obtain products that potentially offer desirable combinations of characteristics. However, it may be difficult or even impossible in practice to achieve many potential combinations through simple blending because of some inherent and fundamental problem. Frequently, the two polymers are thermodynamically immiscible, which precludes generating a truly homogeneous product. This immiscibility may not be a problem since often it is desirable to have a two-phase structure. However, the situation at the interface between these two phases very often does lead to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structured morphologies impossible.

It is particularly desirable to increase the tensile strength and tear strength in rubber compounds. It is particularly desirable to prepare a copolymer useful as an oil substitute that performs the function of a polymer extender or plasticizer while enhancing beneficial polymer properties such as tensile strength, maximum elongation, tear strength and damping properties.

OBJECTS OF THE INVENTION

Accordingly, it is an object of this invention to provide a poly(disubstituted-ethylene-co-maleimide) that is useful as a plasticizer or an oil substitute to be used as an a polymer extender that enhances beneficial polymer properties such as tensile strength, maximum elongation, tear strength, damping properties, and the like.

Finally, it is yet another object of the invention is to produce a blend of an elastomer and a poly(disubstituted-ethylene-co-maleimide) copolymer that exhibits improved properties such as tensile strength, maximum elongation, tear strength, damping properties, and the like versus oil extended elastomers.

SUMMARY OF THE INVENTION

The present invention is directed to the use of poly (disubstituted-ethylene-co-maleimide) copolymers to extend or plasticize rubbers to improve the tensile strength, tear strength and damping properties of the modified rubber.

The present invention is broadly directed to copolymer compositions of a poly(disubstituted-ethylene-co-maleic anhydride) reacted with an amine.

DETAILED DESCRIPTION OF THE INVENTION

The extended elastomeric polymer of the present invention contains: 100 parts by weight of a solid elastomeric polymer such as a thermodynamically miscible elastomeric polymer or copolymer; and 0.5–200 parts by weight of a poly($R_1(R_2)$ethylene-co-maleimide) copolymer placticizer, wherein $R_1$ and $R_2$ are the same or different substituents on the same α-carbon atom of the ethylene group selected from the group consisting of unsubstituted and substituted $C_1$ to $C_{20}$ alkyl groups, the substituted groups being non-reactive with the remaining components of the centipede polymers such as alkoxyalkyl groups having $C_2$ to $C_{20}$ atoms.

The poly($R_1(R_2)$ethylene-co-maleimide) is a "centipede" polymer formed by imidizing a poly($R_1(R_2)$ethylene-co-maleic anhydride) with a primary amine. The "centipede" polymer has a high molecular weight spine connected with many relatively short side chains formed from the addition of the primary amines. The length of the main chain usually equals or is longer than the entanglement length, which is herein defined theoretically as an order of magnitude of 100 repeating units, while the length of the side chains is much smaller than the entanglement length.

The $R_1(R_2)$ethylene contributed monomer units of the poly($R_1(R_2)$ethylene-co-maleimide) "centipede" polymer contain 4 to about 40 carbon atoms wherein $R_1$ and $R_2$ are the same or different substituents on the same α-carbon atom of the ethylene group selected from the group consisting of unsubstituted and substituted $C_1$ to $C_{20}$ alkyl groups, the substituted groups, such as alkoxyalkyl groups having $C_2$ to $C_{20}$ atoms, being non-reactive with the remaining components of the centipede polymers. Examples of unsubstituted and substituted alkyl groups $R_1$ and $R_2$ in the $R_1(R_2)$ ethylene contributed monomer units are methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyheptyl, methoxyoctyl, methoxynonyl, methoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyhexyl, propoxyheptyl, propoxyoctyl, propoxynonyl, propoxydecyl, butoxybutoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl, octyloxymethyl, octyloxyethyl, octyloxypropyl, octyloxybutyl, octyloxypentyl, octyloxyhexyl, octyloxyheptyl, octyloxynonyl, octyloxyoctyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-methylpentyl, 2-methylhexyl, 2-methylheptyl, 2-methyloctyl, 2,3-dimethylbutyl, 2,3,3-trimethylbutyl, 3-methylpentyl, 2,3-dimethylpentyl, 2,4-dimethylpentyl, 2,3,3,4-tetramethylpentyl, 3-methylhexyl, 2,5-dimethylhexyl and the like. In the preferred embodiment of the invention $R_1$ and $R_2$ are methyl groups and $R_1(R_2)$ ethylene is isobutylene.

The poly($R_1(R_2)$ethylene-co-maleimide) of the present invention is formed by reacting a poly($R_1(R_2)$ethylene-co-(maleic anhydride) at from about 100° C. to about 250° C. and from about slightly above vacuum to about 20 atmospheres, under substantially dry conditions in the presence of a primary amine. The present invention is preferably directed to a polymer compositions of a poly(isobutylene-co-maleimide) formed by reacting a poly(isobutylene-co-maleic anhydride) with a primary amine.

For the purposes of this invention, poly($R_1(R_2)$ethylene-co-maleimide) and poly($R_1$–$(R_2)$ethylene-co-maleic anhydride) are defined to encompass random and stereospecific copolymers, including copolymers having alternating $R_1(R_2)$ethylene and maleimide or maleic anhydride contributed monomer units along the polymer backbone. Such alternating structure are typically described as poly($R_1$($R_2$)ethylene-alt-maleimide) and poly($R_1(R_2)$ethylene-alt-maleic anhydride); however, these polymers are encompassed herein within the descriptions poly($R_1(R_2)$ethylene-co-maleimide) and poly($R_1(R_2)$ethylene-co-maleic anhydride).

Processes for forming poly($R_1(R_2)$ethylene-co-maleic anhydride) polymers are well known to those skilled in the art. The preparation of the copolymers from electron donor monomers, such as disubstituted ethylene, and electron acceptor monomers, such as maleic anhydride, as a result of complexation of the electron acceptor monomers may be carried out in the absence as well as in the presence of an organic free radical initiator in bulk, or in an inert hydrocarbon or halogenated hydrocarbon solvent such as benzene, toluene, hexane, carbon tetrachloride, chloroform, etc. (N. G. Gaylord and H. Antropiusova, Journal of Polymer Science, Part B, 7, 145 (1969) and Macromolecules, 2, 442 (1969); A. Takahashi and N. G. Gaylord, Journal of Macromolecular Science (Chemistry), A4, 127 (1970).

Poly($R_1(R_2)$ethylene-co-maleic anhydride) polymers are prepared by reacting monomers of $R_1(R_2)$ethylene-co-maleimide with maleic anhydride. The preferred $R_1(R_2)$ ethylene monomer used for forming the poly($R_1(R_2)$ ethylene-co-maleic anhydride) polymer is isobutylene.

The poly($R_1(R_2)$ethylene-co-maleic anhydride) for use in the present invention is a polymer containing from about 5 to 99 mole percent of maleic anhydride (and subsequent maleimide) monomer contributed units with the remaining 1 to 95 mole percent being $R_1(R_2)$ethylene monomer contributed units. The preferred poly($R_1(R_2)$ethylene-co-maleic anhydride) contains from 20 to 50 mole percent of maleic anhydride monomer (and subsequent maleimide) contributed units and 80 to 50 mole percent of $R_1(R_2)$ethylene monomer contributed units. The most preferred poly($R_1(R_2)$ ethylene-co-maleic anhydride) for use in the present invention is poly(isobutylene-co-maleic anhydride) containing 50 mole percent of maleic anhydride monomer contributed units and 50 mole percent of isobutylene monomer contributed units. The comonomers, maleic anhydride and $R_1(R_2)$ ethylene, can be randomly or alternatingly to distributed in the chain, however, it is preferred to have these comonomers alternating along the polymer backbone chain.

The poly($R_1(R_2)$ethylene-co-maleic anhydride) has a molecular weight range between about 1,000 and up to about 500,000 or higher, more typically between about 10,000 and 500,000, and even more typically between about 150,000 and 450,000, where the molecular weight is weight-average ("$M_W$").

The poly($R_1(R_2)$ethylene-co-maleimide) of the present invention is formed by reacting a poly($R_1(R_2)$ethylene-co-maleic anhydride) in the presence of a mono-primary amine at a temperature from about 100° C. to about 300° C. and at a pressure from about slightly above vacuum to about 20 atmospheres, under substantially dry conditions. The reactants are preferably dry mixed in the absence of solvents in a suitable mixing apparatus such as a Brabender mixer. It is preferable to purge the mixer with nitrogen prior to the charging of the reactants. The primary amine may be added in a singular charge or in sequential partial charges into the reactor containing a charge of poly($R_1(R_2)$ethylene-co-maleic anhydride). Preferably the primary amine is charged in ratio between 0.8 to 1.0 of moles of amine per monomer contributed units of maleic anhydride in the poly($R_1(R_2)$ ethylene-co-maleic anhydride).

Suitable primary amine include but are not limited to: alkyl amines; alkyl benzyl amines; alkyl phenyl amines; alkoxybenzyl amines; alkyl aminobenzoates; alkoxy aniline;

and other linear primary amines containing from 1 to 50 carbon atoms, preferably 6 to 30 carbon atoms, in the alkyl and alkoxy substituents in these primary amines. It is understood that the alkyl and alkoxy substituents on the above discussed primary amines can be linear or branched, preferably linear, and saturated or unsaturated, preferably saturated. Exemplary, but not exclusive of such amines are: hexylamine, octylamine, dodecylamine and the like.

The poly($R_1(R_2)$ethylene-co-maleimide), preferably has a molecular weight range between about 1,000 and up to about 500,000 or higher, more typically between about 10,000 and 500,000, and even more typically between about 150,000 and 450,000, where the molecular weight is weight-average ("$M_W$").

The centipede poly($R_1(R_2)$ethylene-co-maleimide) polymers of the present invention may be prepared by any means well known in the art for combining such ingredients, such as blending, milling or internal batch mixing. A rapid and convenient method of preparation comprises heating a mixture of the components to a temperature of about 50° C. to about 290° C.

The centipede poly($R_1(R_2)$ethylene-co-maleimide) polymers of this invention are preferably manufactured by mixing and dynamically heat-treating the components described above, namely, by melt-mixing. As for the mixing equipment, any conventional, generally known equipment such as an open-type mixing roll, closed-type Banbury mixer, closed type Brabender mixer, extruding machine, kneader, continuous mixer, etc., is acceptable. The closed-type Brabender mixer is preferable, and mixing in an inactive gas environment, such as nitrogen or argon, is also preferable.

In accordance with the present invention, the poly($R_1(R_2)$ethylene-co-maleimide) copolymer composition of the present invention may be added as an additive or as a plasticizer to an elastomeric polymer in an amount ranging from about 0.5 to 200 parts by weight of poly($R_1(R_2)$ethylene-co-maleimide) copolymer plasticizer per 100 parts by weight of a solid elastomer such as an elastomeric polymer or copolymer, preferably in an amount ranging from about 0.1 to about 50 parts by weight of poly($R_1$–$(R_2)$ethylene-co-maleimide) copolymer per 100 parts by weight of the elastomer, most preferably from about 0.5 to about 20 parts of poly($R_1(R_2)$ethylene-co-maleimide) copolymer per 100 parts of the elastomer. These parts by weight being effective plasticizing amounts of poly($R_1(R_2)$ethylene-co-maleimide) copolymer in elastomers.

Typical, but by no means limited to the types of thermodynamically miscible elastomeric polymers and copolymers that may be compatibly blended and extended by the grafted copolymers of the present invention are elastomeric polymer containing formulations include but not limited to all natural and synthetic polymers and mixtures thereof which are elastomers including: natural rubber, polyisoprene, both cis and trans polybutadiene, butadiene/styrene rubber (SBR), butyl rubber, ethylene/propylene copolymer rubbers (EPM), polychloroprene, ethylene-propylene-diene rubbers (EPDM), acrylic elastomers, polyurethane elastomers, polypiperylene, copolymers or interpolymers of the dienes, for example, copolymers of isoprene and butadiene, butadiene and piperylene, and the like and blends thereof SBR and polybutadiene are preferred elastomers.

The synthetic or rubber elastomers of the present invention are polymers or copolymers made from monomers or comonomers, generally considered by those skilled in the art, capable of forming rubber elastomers. More specifically, the monomers are selected from the group of compounds consisting of conjugated dienes having from 4 to about 10 carbon atoms, comonomers of various dienes having from 4 to 10 carbon atoms so that copolymers are formed and monomers of dienes having from 4 to 10 carbon atoms with olefins having from 2 to 14 carbon atoms. A preferred group of olefin compounds are the vinyl substituted aromatic hydrocarbons containing from 8 to 12 carbon atoms and includes styrene, α-methylstyrene, ortho-, para, and meta-methyl and ethyl styrene and the like. Specific examples of olefins include methene, propene, butene, pentene, hexene, heptene, octene, nonene, decene, dodecene and the like. Concerning the diene compounds, the dienes having from 4 to 6 carbon atoms are preferred.

The synthetic elastomers are prepared according to conventional or common methods or processes well known to those skilled in the art. Generally, an emulsion process may be utilized or a free radical process wherein the elastomer monomer is soluble in a solvent. Of course, the elastomers may additionally be prepared utilizing an anionic polymerization with various commonly employed catalysts such as organolithium compounds.

The use of poly($R_1(R_2)$ethylene-co-maleimide) copolymers produced according to the present invention as plasticizers for elastomeric polymers either alone or as a partial oil substitute increases the damping properties of the elastomeric polymers over comparable oil extended polymers. The use of the poly($R_1(R_2)$ethylene-co-maleimide) copolymers as an extender in elastomeric polymers also increases the tensile strength, the maximum elongation, tear strength and the travel at tear characteristics versus elastomers extended with a comparable amount of oil extender.

Although the present invention also contemplates use of the present poly$R_1(R_2)$ethylene-co-maleimide) copolymers in combination with conventional extender oils as additives to elastomers, an embodiment contemplates the total substitution of conventional extenders by poly($R_1(R_2)$ethylene-co-maleimide) copolymers. Typical prior art extenders replaced by the present poly($R_1$ $(R_2)$ethylene-co-maleimide) copolymers include extender oils and low molecular weight compounds or components. Such extender oils include those well known in the art such as naphthenic, aromatic and paraffinic petroleum oils and silicone oils. Examples of low molecular weight organic compounds or components extenders in the compositions that may be replaced by the graft copolymers of the present invention are low molecular weight organic materials having a number-average molecular weight of less than 20,000, preferable less than 10,000, and most preferably less than 5,000.

Although there is no particular limitation to the material that the present poly($R_1(R_2)$ethylene-co-maleimide) copolymers replace in prior art rubber compounds, the following is a list of examples of appropriate replaceable materials or extenders: (1) softening agents, namely aromatic, naphthenic and paraffinic oil softening agents for rubbers or resins; and (2) plasticizers, namely plasticizers composed of esters including phthalic, mixed phthalic, aliphatic dibasic acid, glycol, fatty acid, phosphoric and stearic esters, epoxy plasticizers, other plasticizers for plastics; and (3) petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins. The present poly($R_1(R_2)$ethylene-co-maleimide) copolymers can be used to replace or partially replace one or more or all of these extenders.

The poly($R_1(R_2)$ethylene-co-maleimide) copolymers of the present invention can have an extender added to the prepared poly($R_1(R_2)$ethylene-co-maleimide) copolymers during final processing. Suitable extenders include extender oils and low molecular weight compounds or components, such as the extenders discussed herein above including: naphthenic, aromatic and paraffinic petroleum oils and silicone oils.

In accordance with the present invention, the poly($R_1(R_2)$ethylene-co-maleimide) polymer compositions of the present invention may have added thereto from about 1 to 1,000 parts by weight of extender per 100 parts by weight of the poly($R_1(R_2)$ethylene-co-maleimide) copolymers. Most preferred amounts of added extender include from about 1 to about 500 parts of oil per 100 parts of poly($R_1(R_2)$ethylene-co-maleimide) copolymer and ideally about 1 to about 30 parts of extender per 100 parts of poly($R_1(R_2)$ethylene-co-maleimide) copolymer.

It is frequently desirable to include other additives well known in the rubber art to the compositions of the present application. Stabilizers, antioxidants, conventional fillers, reinforcing agents, reinforcing resins, pigments, fragrances and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris (nonylphenyl) phosphite, 2,6-di-t-butyl-4-methylphenol and the like. Exemplary conventional fillers and pigments include silica, carbon black, titanium dioxide, iron oxide and the like. These compounding ingredients are incorporated in suitable amounts depending upon the contemplated use of the product, preferably in the range of 1 to 350 parts of additives or compounding ingredients per 100 parts of the combined poly($R_1(R_2)$ethylene-co-maleimide) copolymer and elastomeric polymer.

A reinforcement may be defined as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion and processability. Examples of other elastomers and resins include adhesive-like products including Reostomer (produced by Riken-Vinyl Inc.), hydrogenated polystyrene-(medium or high 3,4) polyisoprene-polystyrene block copolymers such as Hybler (produced by Kurare Inc.), polynorbornenes such as Norsorex (produced by Nippon Zeon Inc.) and the like. In this case the foregoing materials are equally applicable to the instant centipede polymer compositions.

The compositions of the present invention may be prepared by any means well known in the art for combining such ingredients, such as solution blending, milling, internal batch mixing, or continuous extrusion of a solid form of the poly($R_1(R_2)$ethylene-co-maleimide) copolymer and rubber compositions and the other ingredients. A rapid and convenient method of preparation comprises heating a mixture of the components to a temperature of about 50° C. to about 290° C.

The blended compositions of the present invention can be mixed in any conventional mixer such as a Banbury mixer or roll mill or extruder normally conducted within the temperature range of about 120° C. to about 300° C., preferably maintaining the composition above its melting point for a few minutes up to several hours, preferably 10 to 40 minutes. A particularly useful technique is to add any fillers in the beginning of the mixing cycle in order to take maximum advantage of heating time and to prevent surface bleeding and overheating when forming the molded articles.

In summary, the molded polymers produced from the blend of an elastomer and poly($R_1(R_2)$ethylene-co-maleimide) copolymer compositions of the present invention retain elastomeric characteristics and are useful in high damping applications.

Damping is the absorption of mechanical energy by a material in contact with the source of that energy. It is desirable to damp or mitigate the transmission of mechanical energy from, e.g., a motor, engine, or power source, to its surroundings. Elastomeric materials are often used for this purpose. It is desirable that such materials be highly effective in converting this mechanical energy into heat rather than transmitting it to the surroundings. It is further desirable that this damping or conversion is effective over a wide range of temperatures and frequencies commonly found near motors, automobiles, trucks, trains, planes, and the like.

A convenient measurement of damping is the determination of a parameter called tan $\delta$. A forced oscillation is applied to a material at frequency f and the transmitted force and phase shift are measured. The phase shift angle delta is recorded. The value of tan $\delta$ is proportional to the ratio of (energy dissipated)/(energy stored). The measurement can be made by any of several commercial testing devices, and may be made by a sweep of frequencies at a fixed temperature, then repeating that sweep at several other temperatures, followed by the development of a master curve of tan $\delta$ vs. frequency by curve alignment. An alternate method is to measure tan $\delta$ at constant frequency (such as at 10 hz) over a temperature range. We have defined an unfilled material as useful for damping when tan $\delta > \sim 0.3$ over at least a 4 decade range, preferably a 6 decade range of frequency.

It is further important that this high degree of absorption of energy be accompanied by good mechanical and thermal stability, as the part prepared from the subject polymers will be cycled through various environments and repeatedly such to various forces of compression, tension, bending, and the like.

The compositions of the present invention are favorably used in the manufacturing of any product in which the following properties are advantageous: a degree of softness, heat resistance, decent mechanical properties, elasticity and/or high damping. The compositions of the present invention can be used in all industry fields, in particular, in the fabrication of automotive parts, tire tread rubbers, household electrical appliances, industrial machinery, precision instruments, transport machinery, constructions, engineering, medical instruments and tire rubber formulations.

Representative examples of the use of the graft copolymers rubber blends of the present invention are in the fabrication of damping materials and vibration restraining materials. These uses involve connecting materials such as sealing materials, packing, gaskets and grommets, supporting materials such as mounts, holders and insulators, and cushion materials such as stoppers, cushions, and bumpers. These materials are also used in equipment producing vibration or noise and household electrical appliances, such as in air-conditioners, laundry machines, refrigerators, electric fans, vacuums, driers, printers and ventilator fans. Further, these materials are also suitable for impact absorbing materials in audio equipment and electronic or electrical equipment, sporting goods and shoes. Furthermore these materials are suitable for use in racing tire formulations.

In the following, the present invention will be described in more detail with reference to non-limitative examples. The following examples and tables are presented for purposes of illustration only and are not to be construed in a limiting sense.

Preparation of Centipede Polymer

EXAMPLE 1

A nitrogen purged Brabender mixer (~300 gram capacity) equipped with a Banbury blade was initially set to 10 rpm and the temperature was set to 30° C. The mixer was then charged with 120 g of poly(isobutylene-alt-maleic anhydride) (IM-10 obtained from Kuraray Co. Ltd., Tokyo, Japan; $M_n$ of 350,00) and 99.4 g of octyl amine (obtained from Aldrich Chemical Company of 1001 West Saint Paul Avenue, Milwaukee, Wis., 99% purity). After 10 minutes of continuous mixing, the mixture was allowed to heat up at a rate of 10° C./min. Once the temperature reached 125° C., agitation was discontinued. When the stock temperature reached 210° C., the heating element was set at isothermal conditions and agitation speed was slowly increased from 0 to 90 rpm at a rate of 10 rpm/min. Once the agitation speed reached 90 rpm, the temperature was re-set to 190° C. The mixing was continued isothermally for an additional 90 minutes, then the heating element of the mixer was turned off, and the polymer mass within the mixer was permitted to cool down to 160° C. at a rate of ~4° C./min. The agitation was then stopped and the polymer product mass was then removed from the mixer. Properties of the recovered polymer including mean molecular weight ($M_n$), polydispersity [number average molecular weight ($M_W$)/mean molecular weight ($M_n$)], and intrinsic viscosity ($\eta_0$) at 20° C. in tetrahydrofuran (THF) are displayed in Table 1.

EXAMPLE 2

The procedure of Example 1 was followed except that the mixer was charged with 110 g of poly(isobutylene-alt-maleic anhydride) (IM-10) and 110.9 g of decyl amine (obtained from Aldrich Chemical Company, 98% purity).

EXAMPLE 3

The procedure of Example 1 was followed except that the mixer was charged with 100 g of poly(isobutylene-alt-maleic anhydride) (IM-10) and 118.8 g of dodecyl amine (obtained from Aldrich Chemical Company, 95% purity).

EXAMPLE 4

The procedure of Example 1 was followed except that the mixer was charged with 65 g of poly(isobutylene-alt-maleic anhydride) (IM-10) and 100 g of hexadecyl amine (obtained from Aldrich Chemical Company, 99% purity).

EXAMPLE 5

The procedure of Example 1 was followed except that the mixer was charged with 90 g of poly(isobutylene-alt-maleic anhydride) (IM-10) and 155.4 g of octadecyl amine (obtained from Aldrich Chemical Company, 99% purity).

IR absorption peaks characteristic of the polymer masses recovered in Examples 1 to 5 were noted substantially at 1701 cm$^{-1}$, 1770 cm$^{-1}$, 2855 cm$^{-1}$ and 2926 cm$^{-1}$. No trace of maleic anhydride absorption peaks or amino-group peaks were detected for these polymers. Properties of the polymer masses recovered in Examples 1 to 5 are displayed in Table 1. Molecular weight was determined by a GPC method using polystyrene as a standard.

TABLE 1

| Example No. | 1 | 2 | 3 | 4 | 5 |
| --- | --- | --- | --- | --- | --- |
| Molecular weight ($M_n$) | 16,000 | 96,000 | 98,000 | 110,000 | 116,000 |
| Polydispersibility ($M_w/M_n$) | 1.76 | 2.36 | 2.16 | 1.98 | 2.32 |
| Intrinsic Viscosity in THF, 20° C. | 0.75 | 0.77 | 0.72 | 0.68 | 0.74 |

EXAMPLES 6 to 11

Application of the Synthesized Polymers in Rubber Compounds

In Examples 6 to 11, rubber compositions were prepared according to the formulation as displayed in parts by weight as shown in Table 2 as formulated by the procedure displayed in Table 3. In comparative Example 6, no polymer produced according to the process of the present invention was added. In Example 7, the polymer produced in Example 1 was used to partially replace (10 of the 18.25 parts by weight) of amount of aromatic oil normally used in the rubber formulation as shown in Table 2. In Examples 8, 9, 10 and 11; the polymers produced in Examples 2, 3, 4 and 5, respectively, was used to partially replace (10 of the 18.25 parts by weight) of amount of aromatic oil normally used in the rubber formulation as shown in Table 2. The rubber compound used in the formulation in Table 2 was an oil-extended high-styrene SBR (20 phr aromatic oil) which contained 33% bound styrene with a $T_g$ of −47° C. The cis-BR used was a high-cis polybutadiene with a cis content of 96%. In each example, the components were kneaded by the method indicated in Table 3. The final stock was sheeted and molded at 165° C. for ~15 minutes.

For each of the sample vulcanized rubber compounds of Examples 6 to 11, measurements of the modulus of elasticity, maximum elongation; tensile strength; tear strength and travel at tear; and, hysteresis loss were taken. The results of these measurements appears in Table 4. Measurements of tensile strength were based upon the conditions of ASTM-D 412 at 22° C. Test specimen geometry was taken in the form of a ring having a width of 0.05 inches and a thickness of 0.075 inches. The specimen was tested at a specific gauge length of 1.0 inches. The measurements of tear strength were based on conditions of ASTM-D 624 at 170° C. Test specimen geometry was also taken in the form of a nicked ring in accordance with the conditions defined in ASTM-624-C. The specimen was tested at the specific gauge length of 1.750 inches. The hysteresis loss was measured with a Dynastat Viscoelastic Analyzer. The test specimen geometry was also taken in the form of a cylinder of a length of 0.6125 inches and a diameter of 0.375 inches. The specimen was tested at a frequency of 1 Hz and a temperature of 50° C. A static mass of 2.0 MPa and a dynamic mass of 2.50 MPa were applied for the test.

As can be seen in Table 4, the rubber compositions of Examples 7 to 11 exhibited very well balanced: tensile strengths; tear strengths; and, damping properties. The tensile strength, tear strength and damping properties of the modified rubber compounds, i.e. Examples 7 to 11, were improved in comparison to the oil extended rubber compounds of comparative Example 6, basing the comparison upon the same modulus conditions.

Accordingly, it was concluded that the modified polymers developed according to the present invention (as shown in Examples 1 to 5) are suitable as high damping additives in rubber compounds. It was further concluded that these polymers could be used as alternative substitutes for oils and/or plasticizers.

TABLE 2

| | |
|---|---|
| Styrene-Butadiene Rubber (SBR, Duradene 753) | 96.80 |
| Butadiene Rubber (cis-BR, Diene 600) | 20.00 |
| Carbon Black (ISAF) | 70.00 |
| Aromatic Oil | 18.25 |
| Stearic Acid | 2.00 |
| Wax | 1.50 |
| Antioxidant [N-(1,3 dimethybutyl)-N'-phenyl-p-phenylene-diamine] | 0.95 |
| Sulfur | ~1.70 |
| Accelerator [N-tert-butyl-benzothiazolesulfenamine] | 0.80 |
| Zinc Oxide | 2.00 |
| Antioxidant [polymerized 1,2-dihydro-2,2,4-trimethylquioline] | 0.22 |
| Accelerator (benzothiazyl disulfide) | 0.20 |
| Accelerator (tetra-methylthiuram monosulfide) | 0.20 |

TABLE 3

| | |
|---|---|
| Mixer | 310 g Brabender |
| Agitation Speed | 60 rpm |
| Mater Batch Stage | |
| Initial Temperature | 110° C. |
| 0 sec | charging polymers |
| 30 sec | charging carbon black and all pigments |
| 5 min | drop |
| Remill Batch Stage | |
| Initial Temperature | 110° C. |
| 0 sec | charging mater batch stock |
| 4 min | drop |
| Final Batch Stage | |
| Initial Temperature | 75° C. |
| 0 sec | charging remilled stock |
| 30 sec | charging curing agent and accelerators |
| 80 sec | drop |

| Example No. | Polymer Used (10 parts by weight) | Modulus at 23° C. at 50% elongation (lbs/in) | Tensile[a] strength at 23° C. (psi) | Maximum elongation at 23° C. (%) | Tear[b] strength at 170° C. (psi) | Travel at Tear at 170° C. (%) | Tan δ at 50° C. (at 23° C.) |
|---|---|---|---|---|---|---|---|
| 6 (comp.) | | 196 | 2840 | 463 | 235 | 275 | 0.208 (0.279) |
| 7 | Example 1 | 228 | 3087 | 533 | 240 | 347 | 0.233 (0.410) |
| 8 | Example 2 | 257 | 3588 | 522 | 247 | 349 | 0.222 (0.354) |
| 9 | Example 3 | 195 | 2900 | 517 | 254 | 352 | 0.212 (0.319) |
| 10 | Example 4 | 205 | 3045 | 514 | 258 | 346 | 0.216 (0.288) |
| 11 | Example 5 | 237 | 2946 | 497 | 224 | 305 | 0.207 (0.286) |

[a]Tensile test results were based on the average of three specimens
[b]Tear test results were based on the average of four specimens While certain representative embodiments and details have been shown for the purpose of illustrating the invention, it will be apparent to those skilled in this art that various changes and modifications may be made therein without departing from the scope of the invention.

What is claimed is:

1. A method for the formation of a high damping copolymer blend, comprising:
    mixing an elastomeric polymer or copolymer with a poly($R_1(R_2)$ethylene-co-maleimide) copolymer wherein $R_1$ and $R_2$ are the same or different substituents selected from the group consisting of unsubstituted and substituted $C_1$ to $C_{20}$ alkyl groups at a temperature of about 50° C. to about 290° C.

2. The method of claim 1, wherein the poly($R_1(R_2)$ ethylene-co-maleimide) comprises from about 5 to 99 mole percent of maleimide monomer contributed units and 1 to 95 mole percent of $R_1(R_2)$ethylene monomer contributed units.

3. The method of claim 1, wherein the poly($R_1(R_2)$ ethylene-co-maleimide) comprises from about 20 to 50 mole percent of maleimide contributed units and 80 to 50 mole percent of $R_1(R_2)$ethylene monomer contributed units.

4. The method of claim 1, wherein $R_1$ and $R_2$ are independently selected from the group consisting of: methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyheptyl, methoxyoctyl, methoxynonyl, methoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyhexyl, propoxyheptyl, propoxyoctyl, propoxynonyl, propoxydecyl, butoxybutoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl octyloxymethyl, octyloxyethyl, octyloxypropyl, octyloxybutyl, octyloxypentyl, octyloxyhexyl, octyloxyheptyl, octyloxynonyl, octyloxyoctyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-methylpentyl, 2-methylhexyl, 2-methylheptyl, 2-methyloctyl, 2,3-dimethylbutyl, 2,3,3-trimethylbutyl, 3-methylpentyl, 2,3-dimethylpentyl, 2,4-dimethylpentyl, 2,3,3,4-tetramethylpentyl, 3-methylhexyl, 2,5-dimethylhexyl and the like, and mixtures thereof.

5. The method of claim 1 wherein the maleimide contributed monomer units of the poly($R_1(R_2)$ethylene-co-maleimide) is formed by the reaction of maleic anhydride and a primary amine.

6. The method of claim 5 wherein the primary amine is selected from the group consisting of: alkyl amines; alkyl benzyl amines; alkyl phenyl amines; alkoxybenzyl amines; alkyl aminobenzoates; and alkoxy aniline; containing from 1 to 50 carbon atoms in the alkyl and alkoxy substituents in the primary amine.

7. The method of claim 1 wherein the elastomeric polymer or copolymer is selected from the group consisting of: natural rubber, polyisoprene, polybutadiene, butadiene/styrene rubber (SBR), ethylene/propylene copolymer rubbers, butyl rubber, ethylene/propylene copolymer rubbers (EPM), polychloroprene, ethylene-propylene-diene rubbers (EPDM), acrylic elastomers, polyurethane elastomers, polypiperylene, copolymers or interpolymers of the dienes, and blends thereof.

8. The method of claim 1, wherein the poly($R_1(R_2)$ethylene-co-maleimide) is poly(isobutylene-co-maleimide).

9. The method of claim 1 wherein the high damping copolymer blend comprises: 0.5 to 200 parts by weight the poly($R_1(R_2)$ethylene-co-maleimide) copolymer per 100 parts by weight of the elastomeric polymer.

10. A plasticized elastomeric polymer composition comprising:
an elastomeric polymer or copolymer blended with a poly($R_1(R_2)$ethylene-co-maleimide) copolymer wherein $R_1$ and $R_2$ are the same or different substituents selected from the group consisting of unsubstituted and substituted $C_1$ to $C_{20}$ a groups.

11. The plasticized elastomeric polymer composition of claim 10, wherein the poly($R_1$–$(R_2)$ethylene-co-maleimide) comprises from about 5 to 99 mole percent of maleimide monomer contributed units and 1 to 95 mole percent of $R_1(R_2)$ethylene monomer contributed units.

12. The plasticized elastomeric polymer composition of claim 10, wherein the poly($R_1(R_2)$ethylene-co-maleimide) comprises from about 20 to 50 mole percent of maleimide contributed units and 80 to 50 mole percent of $R_1(R_2)$ ethylene monomer contributed units.

13. The plasticized elastomeric polymer composition of claim 10, wherein $R_1$ and $R_2$ are independently selected from the group consisting of: methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyheptyl, methoxyoctyl, methoxynonyl, methoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyhexyl, propoxyheptyl, propoxyoctyl, propoxynonyl, propoxydecyl, butoxybutoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl, octyloxymethyl, octyloxyethyl, octyloxypropyl, octyloxybutyl, octyloxypentyl, octyloxyhexyl, octyloxyheptyl, octyloxynonyl, octyloxyoctyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-methylpentyl, 2-methylhexyl, 2-methylheptyl, 2-methyloctyl, 2,3-dimethylbutyl, 2,3,3-trimethylbutyl, 3-methylpentyl, 2,3-dimethylpentyl, 2,4-dimethylpentyl, 2,3,3,4-tetramethylpentyl, 3-methylhexyl, 2,5-dimethylhexyl and the like, and mixtures thereof.

14. The plasticized elastomeric polymer composition of claim 10, wherein the maleimide contributed monomer units of the poly($R_1(R_2)$ethylene-co-maleimide) is formed by the reaction of maleic anhydride and a primary amine.

15. The plasticized elastomeric polymer composition of claim 14 wherein the primary amine is selected from the group consisting of: alkyl amines; alkyl benzyl amines; alkyl phenyl amines; alkoxybenzyl amines; alkyl aminobenzoates; and alkoxy aniline; containing from 1 to 50 carbon atoms in the alkyl and alkoxy substituents in the primary amine.

16. The plasticized elastomeric polymer composition of claim 10 wherein the elastomeric polymer or copolymer is selected from the group consisting of: natural rubber, polyisoprene, polybutadiene, butadiene/styrene rubber (SBR), ethylene/propylene copolymer rubbers, butyl rubber, ethylene/propylene copolymer rubbers (EPM), polychloroprene, ethylene-propylene-diene rubbers (EPDM), acrylic elastomers, polyurethane elastomers, polypiperylene, copolymers or interpolymers of the dienes, and blends thereof.

17. The plasticized elastomeric polymer composition of claim 10, wherein the poly($R_1(R_2)$ethylene-co-maleimide) is poly(isobutylene-alt-maleimide).

18. The plasticized elastomeric polymer composition of claim 10, wherein the high damping copolymer blend comprises: 0.5 to 200 parts by weight the poly($R_1(R_2)$ethylene-co-maleimide) copolymer per 100 parts by weight of the elastomeric polymer or copolymer.

19. The plasticized elastomeric polymer composition of claim 10, further comprising from 1 to 350 parts of a inorganic filler, additive or compounding ingredient based on 100 parts by weight of the combined poly($R_1(R_2)$ethylene-co-maleimide) copolymer and the elastomeric polymer components.

20. The plasticized elastomeric polymer composition of claim 10, further comprising an extender selected from the group consisting of softening agents, plasticizers, tackifiers, oligomers, lubricants, petroleum hydrocarbons, silicone oil, aromatic oil, naphthenic oil and paraffinic oil.

\* \* \* \* \*

UNITED STATES PATENT AND TRADEMARK OFFICE
CERTIFICATE OF CORRECTION

PATENT NO.    : 6,369,166 B1
DATED         : April 9, 2002
INVENTOR(S)   : Xiaorong Wang et al.

It is certified that error appears in the above-identified patent and that said Letters Patent is hereby corrected as shown below:

<u>Column 13,</u>
Line 16, "a groups" should be -- alkyl groups --

Signed and Sealed this

Eighteenth Day of February, 2003

JAMES E. ROGAN
*Director of the United States Patent and Trademark Office*